(12) United States Patent
Shinoki et al.

(10) Patent No.: US 6,664,051 B1
(45) Date of Patent: Dec. 16, 2003

(54) FIXATION OF NUCLEOTIDE DERIVATIVES TO SOLID CARRIER

(75) Inventors: Hiroshi Shinoki, Saitama (JP); Yukio Sudo, Saitama (JP); Osamu Seshimoto, Saitama (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/706,405

(22) Filed: Nov. 3, 2000

(30) Foreign Application Priority Data

Nov. 5, 1999 (JP) ............................. 11-314915

(51) Int. Cl.$^7$ ........................... C07H 21/04; C12Q 1/68
(52) U.S. Cl. ........................... 435/6; 435/174; 536/23.1
(58) Field of Search ..................... 435/6, 174; 536/23.1, 536/24.31, 24.3

(56) References Cited

U.S. PATENT DOCUMENTS 5,403,711 A * 4/1995 Walder et al. ................. 435/6
6,344,316 B1 * 2/2002 Lockhart et al. ............... 435/6
6,420,112 B2 * 7/2002 Balhorn et al. ................ 435/6

OTHER PUBLICATIONS

Zubay. Biochemistry, 3$^{rd}$ Edition, 1993. Wm. C. Brown Publishers, p. 200.*

* cited by examiner

Primary Examiner—Gary Benzion
Assistant Examiner—Jeanine Goldberg
(74) Attorney, Agent, or Firm—Reed Smith LLP

(57) ABSTRACT

A DNA chip or its analogue composed of nucleotide derivatives attached to a solid carrier is prepared by method of bringing nucleotide derivatives having a reactive group at each one terminal into contact with a solid carrier having thereon reactive groups in an aqueous phase in the presence of a transferase which is capable of producing a covalent bond by rearrangement of the reactive group of the nucleotide derivative and the reactive group of the solid carrier.

9 Claims, 2 Drawing Sheets

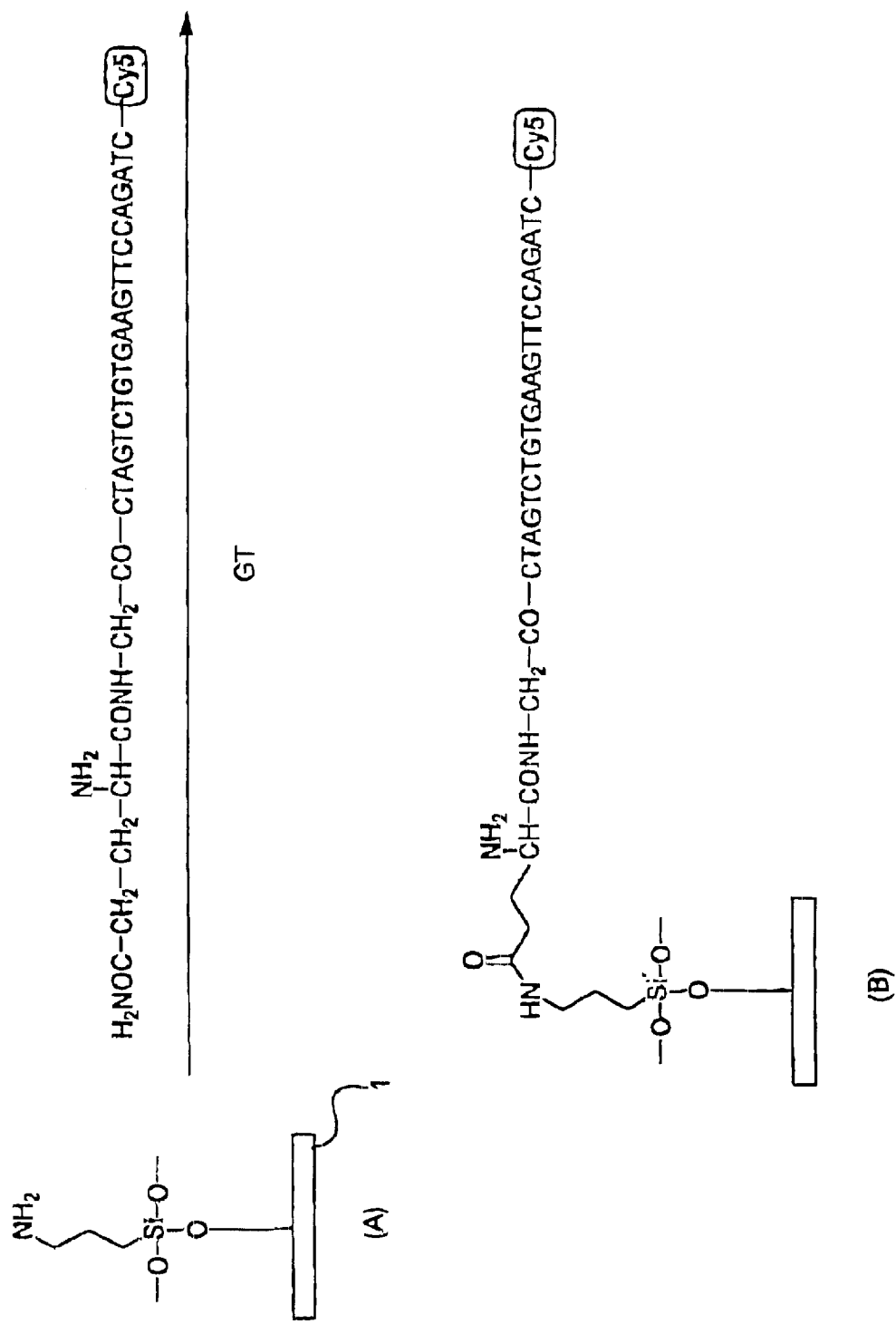

SEQUENCE LISTING

```
<160> NUMBER OF SEQ ID NOS: 2

<210> SEQ ID NO 1
<211> LENGTH: 22
<212> TYPE: DNA
<213> ORGANISM: Artificial Sequence
<220> FEATURE:
<223> OTHER INFORMATION: Synthesized

<400> SEQUENCE: 1
ctagtctgtg aagtgtctga tc                                      22

<210> SEQ ID NO 2
<211> LENGTH: 22
<212> TYPE: DNA
<213> ORGANISM: Artificial Sequence
<220> FEATURE:
<223> OTHER INFORMATION: Synthesized

<400> SEQUENCE: 2
gatcagacac ttcacagact ag                                      22
```

FIXATION OF NUCLEOTIDE DERIVATIVES TO SOLID CARRIER

FIELD OF THE INVENTION

This invention relates to a solid carrier to which nucleotide derivatives (e.g., oligonucleotides, polynucleotides, and peptide-nucleotides) are attached, which is generally named DNA chip and which is favorably employable for detecting, with high sensitivity, complementary nucleic acid fragments.

BACKGROUND OF THE INVENTION

Detection of a nucleic acid fragment is generally performed using a probe DNA which is complementary to the nucleic acid fragment to be detected, by way of hybridization. The probe DNA is generally fixed to a solid carrier (e.g., solid substrate) to produce a DNA chip. In the detection, a nucleic acid fragment in a sample liquid is labelled with a fluorescent label or a radio-isotope label, and then the sample liquid is brought into contact with the probe DNA of the DNA chip. If the labelled nucleic acid fragment in the sample liquid is complementary to the probe DNA, the labelled nucleic acid fragment is combined with the probe DNA by hybridization. The labelled nucleic acid fragment fixed to the DNA chip by hybridization with the probe DNA is then detected by an appropriate detection method such as fluorometry or autoradiography. The DNA chip is widely employed in the gene technology, for instance, for detecting a complementary nucleic acid fragment and sequencing a nucleic acid.

The DNA chip is described, for instance, in Fodor S.P.A., Science, 251, 767(1991) and Schena M., Science, 270, 467(1995). The DNA chip is understood to efficiently detect a small amount of complementary nucleic acid fragments in a small amount of a sample liquid.

Detection of nucleic acid fragment using an electrochemical label is also known (Japanese Patent Provisional Publication No. 9-288080, and a preprint of the 57th Analytical Chemistry Conference pp. 137–138 (1996)), The electrochemical label such as N-hydroxysuccinimide ester of ferrocenecarboxylic acid is attached to a probe DNA. The probe DNA is fixed onto an electroconductive substrate having an output terminal. In the detection procedure, a sample liquid containing target nucleic acid fragments is brought into contact with the probe DNA having the ferrocene derivative label in the presence of an electrochemically active thread intercalator. The target nucleic acid fragment, if it is complementary to the probe DNA, is hybridized with the probe DNA. Into the formed hybrid structure, the electrochemically active thread intercalator is intercalated. Thereafter, a potential is applied to the electroconductive substrate to measure an electric current flowing through the ferrocene derivative label and the thread intercalator.

P. E. Nielsen et al., Science, 254, 1497–1500(1991) and P. E. Nielsen et al., Biochemistry, 36, pp.5072–5077 (1997) describe PNA (Peptide Nucleic Acid or Polyamide Nucleic Acid) which has no negative charge and functions in the same manner as DNA does. PNA has a polyamide skeleton of N-(2-aminoethyl) glycine units and has neither glucose units nor phosphate groups.

Since PNA is electrically neutral and is not charged in the absence of an electrolytic salt, PNA is able to hybridize with a complementary nucleic acid fragment to form a hybrid which is more stable than the hybrid structure giver by a DNA prove and its complementary nucleic acid fragment (Preprint of the 74th Spring Conference of Japan Chemical Society, pp. 1287, reported by Naomi Sugimoto).

Japanese Patent Provisional Publication No. 11-332595 describes a PNA probe fixed on a solid carrier at its one end and a detection method utilizing the PNA probe. The PNA probe is fixed onto the solid carrier by the avidinbiotin method.

The aforementioned P. E. Nielsen et al., Science, 254, 1497–1500(1991) also describes a PNA probe labelled with an isotope element and a detection method of a complementary nucleic acid fragment.

Since the PNA probe shows no electric repulsion to a target nucleic acid fragment in a sample liquid, an improved high detection sensitivity is expected.

At present, two methods are known for preparing a DNA chip having a solid carrier and oligonucleotide or polynucleotide fixed onto the carrier. One preparation method comprises preparing oligonucleotide or polynucleotide step by step on the carrier. This method is named "on-chip method". A typical on-chip method is described in Foder, S.P.A., Science, 251, page 767 (1991)

Another preparation method comprises fixing a separately prepared oligonucleotide or polynucleotide onto a solid carrier. Various methods are known for various oligonucleotides and polynucleotides.

In the case that the complementary derivative (which is synthesized using ni as meld) or a PCR product (which is a DNA fragment prepared by multiplying cDNA by PCR method), an aqueous solution of the prepared DNA fragment is spotted onto a solid carrier having a polycationic coat in a DNA chip-preparing device to attach the DNA fragment to the carrier via electrostatic bonding, and then blocking a free surface of the polycationic coats.

In the case that the oligonucleotide is synthetically prepared and has a functional group, an aqueous solution of the synthetic oligonucleotide is spotted onto an activated solid carrier to produce covalent bonding between the oligonucleotide and the carrier surface. See Lamture, J. B., et al., Nucl. Acids Res., 22, 2121–2125, 1994, and Guo, Z., et al., Nucl. Aids Res., 22, 5456–5465, 1994. Generally, the oligonucleotide is covalently bonded to the surface activated carrier via a spacer or a cross-linker.

Also known is a process comprising the steps of aligning sell polyacrylamide gels on a glass plate and fixing synthethic oligonucleotides onto the glass plate by making a covalent bond between the polyacrylamide and the oligonucleotide (Yershov, G., et al., Proc. Natl. Acad. Sci. USA, 94, 4913(1996)). Sosnowski, R. G., et al., Proc. Natl. Acad. Sci. USA, 94, 1119–1123 (1997) discloses a process comprising the steps of an array of microelectrodes on a silica chip, forming on the microelectrode a streptoavidin-comprising agarose layer, and attaching biotin-modified DNA fragment to the agarose layer by positively charging the agarose layer. Schena, M., et al., Proc. Natl. Acadl Sci. USA, 93, 10614–10619 (1996) teaches a process comprising the steps of preparing a suspension of an amino group-modified PCR product in SSC (i.e., standard sodium chloride-citric acid buffer solution), spotting the suspension onto a slide glass, incubating the spotted glass slide, treating the incubated slide glass with sodium borohydride, and heating thus treated slide glass.

As is explained above, most of the known methods of fixing a separately prepared DNA fragment onto a solid carrier utilize an electrostatic bonding or a covalent bonding such as described above.

In any DNA chip having a separately prepared DNA fragment on its solid carrier, the DNA, fragment should be firmly fixed onto the carrier, so as to perform smoothly hybridization between the fixed DNA fragment and a target DNA fragment complementary to the fixed DNA fragment.

SUMMARY OF THE INVENTION

It is an object of the present invention to provide an improved method for preparing a nucleic acid fragment-detecting means by fixing separately produced nucleotide derivatives to a solid carrier by covalent bonding The present invention resides in a method for fixing a plurality of nucleotide derivatives to a solid carrier which comprises bringing nucleotide derivatives having a reactive group at each one terminal into contact with a solid carrier having thereon reactive groups in an aqueous phase in the presence of a transferase which is capable of producing a covalent bond by rearrangement of the reactive group of the nucleotide derivative and the reactive group of the solid carrier.

BRIEF DESCRIPTION OF DRAWINGS

FIG. 2 schematically illustrates an oligonucleotide-fixing method performed in Example 1.

DETAILED DESCRIPTION OF THE INVENTION

Mechanism of Fixation of Nucleotide Derivatives

Figure 1:
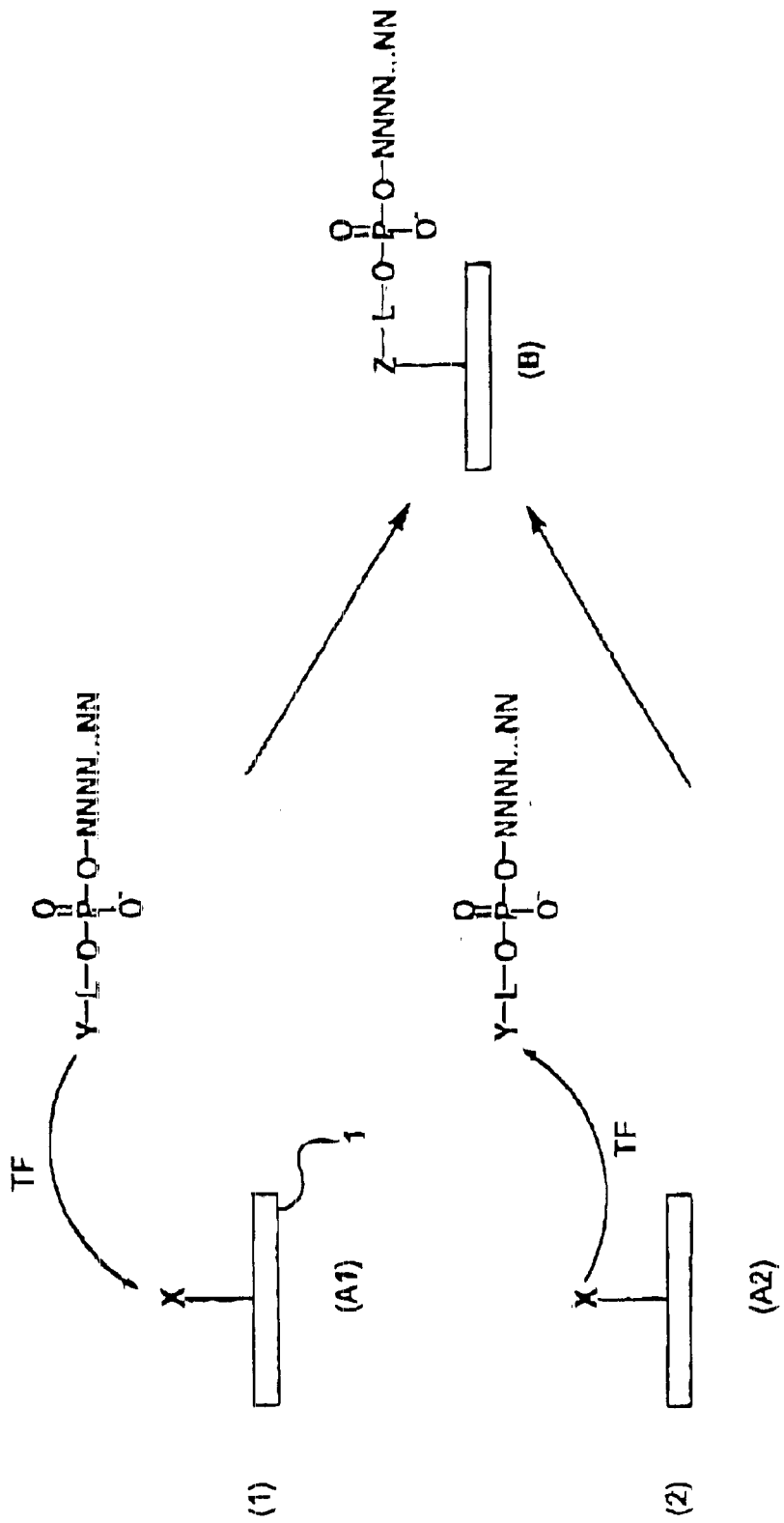
FIG. 1 schematically illustrates representative two nucleotide derivative-fixing methods according to the invention.

In FIG. 1, two typical mechanisms for fixing a nucleotide derivative (typically, oligonucleotide) to a solid carrier according to the invention are schematically illustrated.

In FIGS. 1, —NNNN . . . NN— is an oligonucleotide moiety, L is a linking group, and Z is a covalent bonding site.

According to the mechanism (1), an oligonucleotide hard a reactive group Y (doner) at one terminal is brought into contact with a solid carrier 1 having a reactive group X (acceptor) thereon, namely, (Al), in the presence of a transferase (TF) capable of transferring the doner Y, whereby producing a covalent bond between the doner Y and the acceptor X. Thus, the oligonucleotide is fixed to the solid carrier (B)

According to the mechanism (2), an oligonucleotide having a reactive group Y (acceptor) at one terminal is brought into contact with a solid carrier 1 having a reactive group X (donor) thereon, namely, (AS), in the presence of a transferase (TF) capable of transferring the doner X, whereby producing a covalent bond between the doner X and the acceptor Y. Thus, the oligonucleotide is fixed to the solid carrier (B).

Solid Carrier

The solid carrier can be any of known solid carriers or their equivalent materials, for instance, a glass plate, a resin plate, a metal plate, a glass plate covered with polymer coat, a glass plate covered with metal coat, and a resin plate covered with metal coat. The metal plate or metal-coated plate is generally employed for conducting the electrochemical analysis.

The solid carrier should have a plurality of reactive groups such as the donors or acceptors X of FIG. 1, on its surface.

The reactive group, particularly, a doner group preferably is amino, aldehyde, epoxy, or carboxyl. Particularly preferred is an amino group. The amino group can be placed on the carrier by processing the carrier with a silane-couplings agent or coating an amine group-containing polymer (polycation) such as poly-L-lysine, polyethyleneimine, or poly-alkylamine. When the silane-coupling agent is employed, the silane-coupling agent is fixed to the carrier via covalent-bonding. When the amine group-containing polymer is employed, the polymer is fixed to the carrier by electrostatic bonding. Naturally, the covalent-bonding is preferred from the viewpoint of stable and reliable fixation.

Examples of the silane-coupling agents include γ-aminopropyltrimethoxysilane, and N-β (aminoethyl)-γ-aminopropyltrimethoxysilane, and N-β (aminoethyl)-γ-aminopropylmethyldimethoxysilane. Most preferred is γ-aminopropyltrimethoxysilane.

A combination of processing a solid carrier with a silane-coupling agent in combination with coating with a polycation is also employable.

Nucleotide Derivative

The nucleotide derivatives to be fixed to the solid carrier can be oligonucleotides, polynucleotides, or peptide-nucleotides. The nucleotide derivatives may be DNA fragments. The nucleotide derivative may be polynucleotide such as cDNA, a portion of cDNA, or EST. The polynucleotide is favorably employed for studying gene expression. Otherwise, nucleotide derivatives to be fixed onto the solid carrier may be oligonucleotides, which are favorably employed for studying variations and polymorphism of gene. The oligonucleotide to be fixed onto the solid carrier preferably is one of 3 to 50 mers, more preferably 10 to 25 mers.

The nucleotide derivative to be employed in the invention should have at its one terminal a reactive group which works as a donor group or an acceptor group in the course of rearrangement reaction (or transferring reaction) in the presence of a transferase If the reactive group is a doner group, it preferably is amino, carboxyl, acyl, or carbamoyl. Most preferred is an amino group.

The reactive group can be attached to the nucleotide derivative via a linking group. The linking group preferably is an alkylene group or an N-alkylamino-alkylene group. Preferred are a hexylene group and an N-methylamino-hexylene group.

Transferase: TF

Transferase preferably is an enzyme which catalyzes transfer of a group having one carbon atom. Examples of these transferase include carboxyl transferase and carbamyl transferase. Also preferred is a transferase which catalyzes transfer of an acyl group, such as aminoacyl transferase which may be amide transferase.

Carboxyl transferase can be a conventionally employed peptide synthesizing enzyme. Preferably employed is a cross-linking enzyme which is produced by crystallization of Thermolysin originating from Bacillus thermoproteolyticus or Bacillus licheniformis.

Carbamoyl transferase preferably is ornithine transferase.

Aminoacyl transferase catalyzes transfer (or reaction or rearrangement) between amino of —$CONH_2$ placed at γ-position of glutamine or β-position of asparagine and an amine of other compound.

The reaction can be illustrated as follows:

(Nucleotide derivative)—L²—CONH₂+H₂N—L²—(Carrier)–
(Nucleotide derivative)—L¹—CONH—²—(Carrier)+NH₃

In the above-illustrated formulas, each of $L^1$ and $L^2$ stands for a linking group.

Examples of the aminoacyl transferase include transglutaminase (i.e., D-glutamyl transferase, GT) aid aspartyl transferase. D-glutamyl transferase can be produced from animals, plants, or microorganisms. For instance, D-glutamyl transferase (GT) can be obtained from extracts taken from organs of mammals (preferably liver of marmot) (Connellan, et al., Journal of Biological Chemistry, 246, 4, 1093–1098, blood of mammals (Folk, et al., Advances in Protein Chemistry, 311–313 (1977), or fascia of Halocyn thia roretzi (Japanese Patent Provisional Publication No. 6-30770). GT also can be obtained from plants such as pea (obtained at cleaved site of shoot apex) after purification. Gt can be also obtained from microorganisms such as Bacillus subtilis after purification. Aspartyl transferase can be preferably obtained from Mycobacterium tuberculosis after purification.

If transglutaminase (GT) is employed as the transferase, Y of FIG. 1-(1) is a glutamine residue (i.e., glutamyl), and the amino of γ-amide group of the glutamine residue is transferred.

Procedure of Fixation

The nucleotide derivatives to be fixed on the solid carrier are dissolved or dispersed in an aqueous solution. Generally, the aqueous solution is once placed on a plastic plate having 96 or 384 wells, and then spotted onto a solid carrier using a spotting means.

In order to keep the spotted aqueous solution from evaporating, it is preferred to add a high boiling-point compound to the aqueous solution containing nucleotide derivatives. The high boiling-point compound should be soluble in an aqueous medium, should not disturb hybridization procedure, and preferably has an appropriate viscosity. Examples of the high boiling-point compounds include glycerol, ethylene glycol, dimethylsulfoxide, and a hydrophilic polymer having a low molecular weight (typically, in the range of $10^3$ to $10^6$) such as polyacrylamide, polyethylene glycol, or poly(sodium acrylate). The high boiling-point compound preferably is glycerol or ethylene glycol. The high boiling-point compound is preferably incorporated into an aqueous nucleotide derivative solution in an amount of 0.1 to 2 vol. %, particularly 0.5 to 1 vol. %. Otherwise, the spotted aqueous solution is preferably kept at under the conditions of a high humidity (such as 90% RH or more) and an ordinary temperature (25 to 50° C.).

The aqueous solution is spotted onto the solid carrier under the condition that each drop of the solution generally has a volume of 100 pL to 1 μl, preferably 1 to 100 nL. The nucleotide derivatives preferably spotted onto the solid carrier are in an amount of $10^2$ to $10^5/cm^2$. In terms of mol., 1 to $10^{-15}$ moles are spotted. In terms of weight, several ng or less of nucleotide derivatives are spotted. The spotting of the aqueous solution is made onto the solid carrier to form several dots having almost the sane shape and size. It is important to prepare these dots to have the same shape and size, if the hybridization is quantitatively analyzed. Several dots are formed separately from each other with a distance of 1.5 mm or less, preferably 100 to 300 μm. One dot preferably has a, diameter of 50 to 300 μm.

After the aqueous solution is spotted on the solid carrier, the spotted solution is preferably incubated, namely, kept for a certain period at room temperature or under warming, so as to fix the spotted nucleotide derivatives onto the carrier. In the course of incubation, UV irradiation or surface treatment using sodium borohydride or a Shiff reagent way be applied. The UV irradiation under heating is preferably adopted. It is assumed that these treatments are effective to produce additional linkage or bonding between he solid carrier and the attached oligonucleotide derivatives. The free (namely, unfixed) nucleotide derivatives are washed out with an aqueous solution. Thus washed solid carrier is then dried to give a nucleotide derivative-fixed solid carrier (such as DNA chip) of the invention.

The nucleotide derivative-fixed solid carrier of the invention is favorably employable for monitoring of gene expression, sequencing of base arrangement of DNA, analysis of mutation, analysis of polymorphism, by way of hybridization.

Sample Nucleic Acid Fragment—Target

A target DA fragment or a sample DNA fragment, which is subjected to the analysis concerning the presence of a complementary DNA fragment can be obtained from various origins. In the analysis of gene, the target DNA fragment is prepared from a cell or tissue of eucaryote. In the analysis of genome, the target DNA fragment is obtained from tissues other then erythrocyte. In the analysis of mRNA the target sample is obtained from tissues in which mRNA is expressed. If the DNA chip has an oligonucleotide fixed in its solid carrier, the target DNA fragment preferably has a low molecular weight. The target DNA nay be multiplied by PCR method.

To the target DNA fragment is attached an RI label or a non-RI label by a known method The non-RI label is preferably utilized. Examples of the non-RI labels include fluorescence label, biotin label, and chemical luminescence label. The fluorescence label is most preferably employed. Examples of the fluorescence labels include cyanine dyes (e.g., Cy3 and Cy5 belonging to Cy Dye™ series), rhodamine 6G reagent, N-acetoxy-$N^2$-acetyl-aminofluorene (AAF), and AAIF (iodide derivative of AAF). The target or sample DNA fragments labelled with different fluorescence indicators can be simultaneously analyzed, if the fluorescence indicators have fluorescence spectrum of different peaks. Also employable is an electroconductive level.

Hybridization

The hybridization is performed by spotting an aqueous sample solution containing a target DNA fragment onto a DNA chip. The spotting is generally done in an amount of 1 to 100 nL. The hybridization is carried out by keeping the DNA chip having the spotted sample solution thereon at a temperature between room temperature and 70° C. for 6 to 20 hours. After the hybridization is complete, the DNA chip is washed with an aqueous buffer solution containing a surface active agent, to remove a free(unfixed) sample Dun fragment. The surface active agent preferably is sodium dodecylsulfonate (SDS). The buffer solution may be a citrate buffer solution, a phosphate buffer solution, a borate buffer solution, Tris buffer solution, or Goods buffer solution. The citrate buffer solution is preferably employed.

The hybridization on the DNA chip is characteristic in that an extremely small amount of the sample or target DNA fragment is subjected to the analysis. In order to perform the desired hybridization appropriately, optimum conditions should be determined.

The present invention is further described by the following examples.

EXAMPLE 1

Preparation of DNA Chip

The process for preparing a DNA chip utilized in this example is illustrated in FIG. 2. In FIG. 2, a slide glass is indicated by number 1, and GT means D-glutamyl transferase.

A slide glass (25 mm×75 mm) was immersed in an ethanol solution of 2 wt. % aminopropyltriethoxysilane (available from Shin-etsu Chemical Industries, Co., Ltd.) for 10 minutes. Subsequently, the slide glass was taken out, washed with ethanol, and dried at 110° C. for 10 min. Thus, a silane coupling agent-treated slide glass (A) was prepared.

A nucleotide oligomer (3'-CTAGTCTGTGAAGTGTCTGATC-5', 22 mers, SEQ ID NO 1) having L-glutamylglycine at 3'-terminal and a fluorescent label (FluoroLink, Cy5-dCTP, available from Amasham Pharmacia Biotec Corp.) at 5'-terminal and D-glutamyl transferase (Oriental Yeast Co., Ltd., 11U) were dispersed in 1 L o f an aqueous solution containing a triacetate buffer (300 mM, pH 6.0) at $1\times10^{-M}$.

The resulting aqueous dispersion was spotted onto the silane coupling agent-treated slide glass (A) obtained above, and this was immediately kept at 25° C., 90% RH, for one hour. Thus treated slide glass was then washed successively twice with a mixture of aqueous 0.1 wt. %. SDS (sodium dodecylsulfate) solution and aqueous 2×SSC Solution (obtained by doubly diluting standard sodium chloride-citrate buffer solution (SSC)), once with the aqueous 2×SSC solution, and finally with distilled water Thus washed glass slide was dried at room temperature, to give the desired DE chip (B).

The fluorescence strength of the DE chip (B) was measured using a fluorescence scanning apparatus. The fluorescence strength was 923. The fluorescence strength is well higher than a fluorescence strength 352 which was measured in a conventional DNA chip in which an oligonucleotide was fixed by electrostatic force. This means that the oligonucleotides are well fixed to the slide glass.

EXAMPLE 2

Detection of Sample DNA Fragments (1) Preparation of DNA chip

The procedures of Example 1 were repeated except for not attaching the fluorescent label to the 5'-terminal, to prepare a DNA dip (B').

(2) Detection of Purple DNA Fragment

Target DNA fragments (GATCAGACACTTCACAGACTAG-5', 22 mers, SEQ ID NO 2) which had the fluorescent label Cy5-dCTP at 5'-terminal was dispersed in 20 L of an aqueous hybridization solution (mixture of 4×SSC and 10 wt. % SDS solution) was spotted on the DNA chip (B'). The upper surface of the spotted solution was covered with a cover glass (for microscopic use) and then this was incubated in a moisture chamber at 60° C. for 20 hours. Thus treated DNA chip was washed successively with a mixture of aqueous 0.1 wt. % SDS solution and aqueous 2×SSC solution, a mixture of aqueous 0.1 wt. % SDS solution and aqueous 0.2×SSC solution, and an aqueous 0.2×SSC solution. Thus washed DNA chip was centrifuged at 600 rpm for 20 seconds and then dried at room temperature.

The fluorescence strength of the DNA chip having been subjected to hybridization was measured using a fluorescence scanning apparatus. The fluorescence strength was 568. This means that the target DNA fragments are well fixed to the DNA chip (B').

---

---

What is claimed is:

1. A method for fixing a plurality of nucleotide derivatives to a solid carrier comprising:
   contacting aqueous phase nucleotide derivatives each having a reactive group at one terminal with a solid carrier having thereon reactive groups in the presence of a transferase
   wherein the transferase produces a covalent bond by rearrangement of the reactive group of each nucleotide derivative and the reactive groups of the solid carrier thereby fixing the plurality of nucleotide derivatives to a solid carrier;

wherein the nucleotide derivatives are selected from the group consisting of oligonucleotides, polynucleotides and peptide-nucleic acids.

2. The method of claim 1, wherein the transferase is selected from the group consisting of carboxyl transferase, carbamoyl transferase, and aminoacyl transferase.

3. The method of claim 1, wherein the reactive group of the nucleotide derivative or the solid carrier is selected from the group consisting of amino, carboxyl, acyl and carbamoyl.

4. The method of claim 1, wherein the reactive group of the nucleotide derivative or the solid carrier is selected from the group consisting of amino, aldehyde, epoxy, and carboxyl.

5. The method of claim 1, wherein the reactive group is attached to the nucleotide derivative via a linking group.

6. The method of claim 5, wherein the linking group is an alkaline group or an N-alkylamino-alkylene group.

7. The method of claim 1, wherein the reactive group of the nucleotide derivative is γ-amide group of a glutaminyl moiety attached to the nucleotide derivative, the reactive group of the solid carrier is an amino group attached to the carrier, and the transferase is trans-glutaminase.

8. The method of claim 7, wherein the amino group is attached to the solid carrier by bringing a silane coupling agent into contact with the carrier.

9. The method of claim 1, wherein the solid carrier is selected from a glass plate, a resin plate, a metal plate, a glass plate covered with polder coat, a glass plate covered with metal coat, and a resin plate covered with metal coat.

* * * * *